United States Patent [19]

Hoffmann et al.

[11] 4,239,299
[45] Dec. 16, 1980

[54] BALL BEARING FOR LINEAR MOTION

[75] Inventors: Alfred Hoffmann, Bilthoven, Netherlands; Carl Ullberg, Göteborg, Sweden; Hendrik Rekers, Nieuwegein, Netherlands; Horst M. Ernst, Eltingshausen, Fed. Rep. of Germany; Manfred Brandenstein, Aschfeld, Fed. Rep. of Germany; Armin Olschewski, Schweinfurt, Fed. Rep. of Germany; Toni Schulz, Dittelbrunn, Fed. Rep. of Germany; Lothar Walter, Schweinfurt, Fed. Rep. of Germany

[73] Assignee: SKF Industrial Trading & Development Company B.V., Nieuwegein, Netherlands

[21] Appl. No.: 26,589

[22] Filed: Apr. 4, 1979

[30] Foreign Application Priority Data

Apr. 4, 1978 [DE] Fed. Rep. of Germany ....... 2814371
Jul. 5, 1978 [DE] Fed. Rep. of Germany ....... 2829499

[51] Int. Cl.³ ............................................. F16C 29/06
[52] U.S. Cl. ................................. 308/6 C; 308/237 R
[58] Field of Search ............. 308/6 C, 6 R, 6 A, 6 B, 308/237 R, 189 R, 195

[56] References Cited

U.S. PATENT DOCUMENTS

| 3,884,537 | 5/1975 | McCloskey | 308/6 C |
| 3,940,187 | 2/1976 | Suda | 308/6 C |
| 4,062,602 | 12/1977 | Nilsson | 308/6 C |

Primary Examiner—Lenard A. Footland
Attorney, Agent, or Firm—Daniel M. Rosen

[57] ABSTRACT

A ball bearing for linear movement on a shaft has a cage with oval guideways, and an outer sleeve surrounding the case. The cage has axially extending raceways for guiding loaded balls, the ends of the raceways joining radially outwardly directed transitions. The transitions are weakened by transversely extending grooves or slots, to provide resilience. The raceways may be axially extending radially inwardly directed ridges having central axially extending grooves, and the transitions may have V-shaped recesses with their apices at the ends of the grooves, to define two-point contact with the balls in the transition area of the bearing. A split sleeve may surround the outer sleeve for additional support.

14 Claims, 13 Drawing Figures

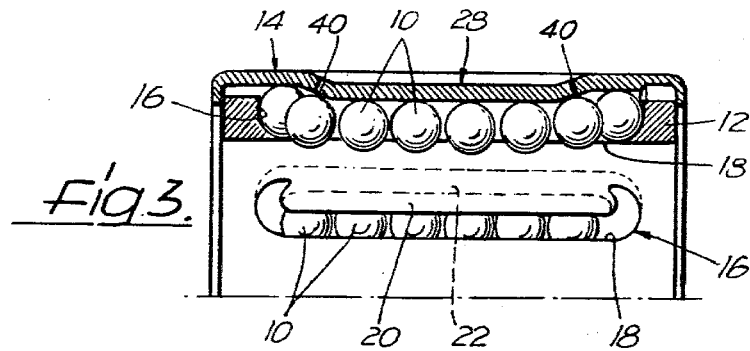
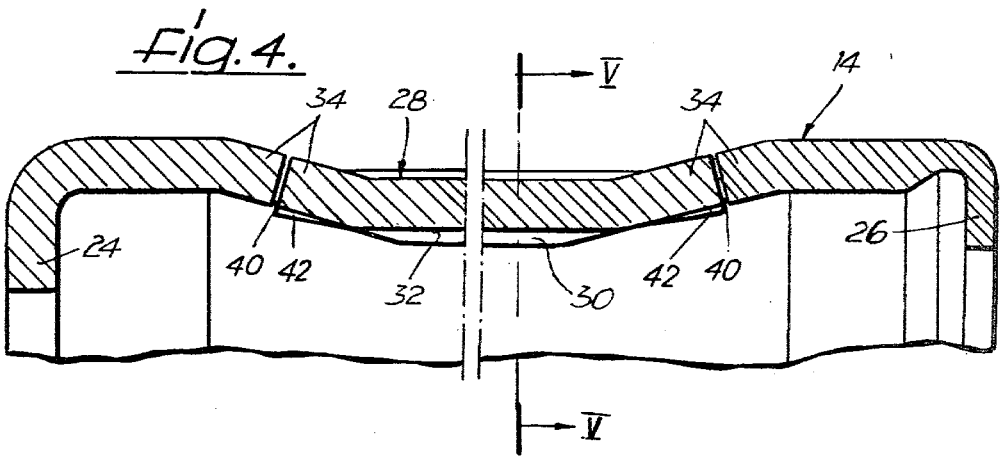
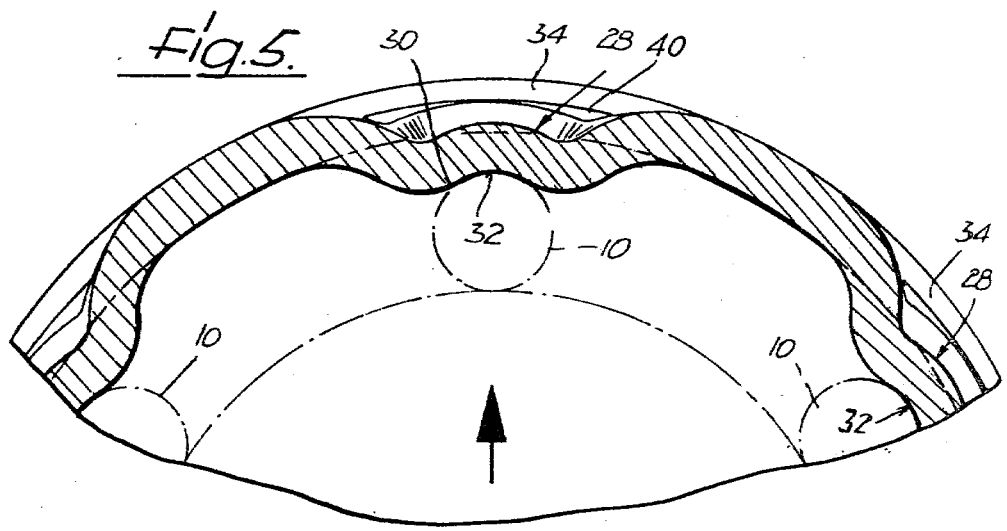

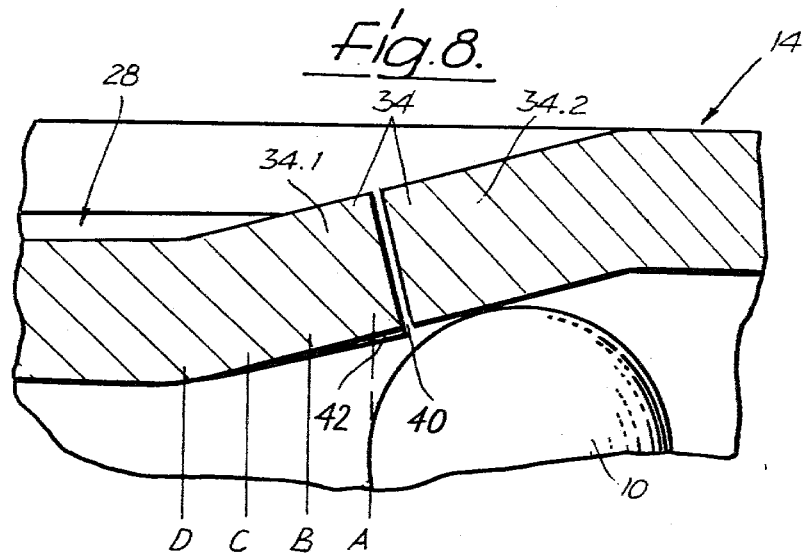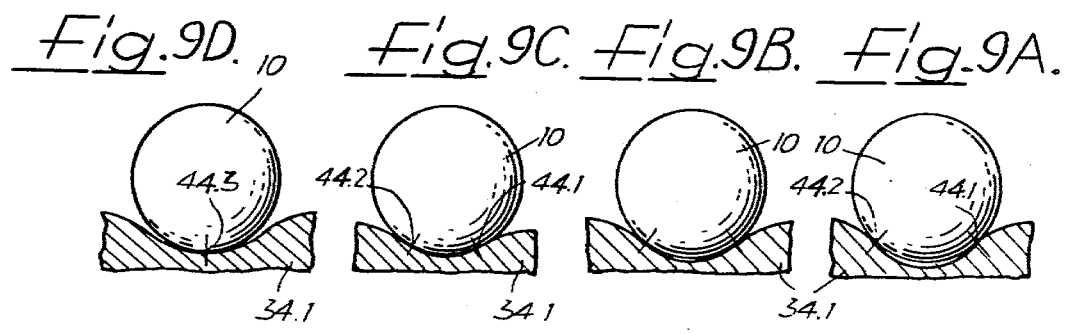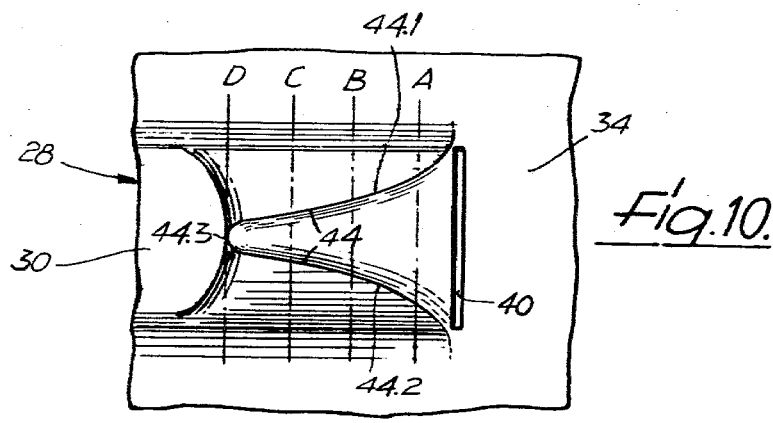

BALL BEARING FOR LINEAR MOTION

BACKGROUND OF THE INVENTION

The invention relates to a ball bearing for linear motion including a ball cage with ball-carrying oval guideways and an outer sleeve receiving said ball cage. The sleeve has ball-carrying, axially parallel raceway sections for the loaded balls, each raceway section having a radially outward directed transition at each end or the respective raceway section.

A ball bearing of this type is disclosed in German Pat. No. 1,916,164, in which the ball-carrying transitions of every raceway section form, together with said section, a rigid unit constituting a unitary part of the outer sleeve, that is to say, every ball-carrying raceway section is rigidly joined both at its longitudinal edges and at its two ends to the outer sleeve. When under load, every raceway section therefore deforms nonuniformly, that is to say, not parallel to the longitudinal axis of the outer sleeve. As a result of this, irregularities which may occur in operation cannot be compensated. Moreover, balls ascending the transition which are being loaded, and the balls descending the transition which are being unloaded are subjected to increased rolling friction, and also to sliding friction. This causes wear not only to the balls, but also to the outer sleeve.

Moreover, U.S. Pat. No. 4,062,602 discloses a ball bearing, each of whose ball-carrying, axially extending parallel raceway sections has a ball-guiding groove wherein the loaded balls hug the bottom of the groove.

SUMMARY OF THE INVENTION

The present invention seeks to remedy the above drawbacks of known bearings. The invention provides a ball bearing of the type discussed above, which not only has more uniform loading and reduced friction of the balls, and hence less wear, but also has a longer service life with operational precision.

In accordance with the invention, every transition has a weakened portion such as a recess extending preferably transversely to the raceway direction, said recess forming a kind of weak-point link between the portions of the transition on opposite sides of the weakened portion.

The weakened portion advantageously enables the transition to yield elastically when a ball forces itself into the narrowed space within the ball-carrying raceway section between the outer sleeve and a shaft accommodating the ball bearing, or forces itself out of that space, and enables the ball-carrying raceway section of the outer sleeve to be elastically deformable by deflection about a longitudinal axis, particularly at its two ends, so that balls being loaded may enter the narrowed space with low friction and the balls being unloaded may leave that space with low friction.

U.S. Pat. No. 3,802,752 discloses an antifriction bearing of a different type in which at least one part carrying the ball race is constructed to be elastically yielding in its entry and exit areas, this bearing part being provided with a groove, called a slot, so that a resilient understructure is formed which yields as a ball starts rolling. The object of this arrangement is to prevent a longitudinally displaceable tool table, supported on antifriction bearings of this type, from being slightly raised and lowered periodically in the course of its work motion. However, all that this prior-art antifriction bearing teaches is the provision, in a special bearing body, of a transverse groove that is open in the direction of the raceway, or is open counter thereto, in order to avoid the cause of a particularly deleterious effect. In contradistinction thereto, the present invention teaches prevention of wear by means of a transverse groove, yielding substantially in the radial direction, in the outer sleeve.

In one particular embodiment of the ball bearing in accordance with the present invention, the weakened portion is disposed at the upper end of the transition in order that both the transition and the adjoining ball-carrying raceway section may be as resilient as possible. For the same reason, it is advisable that the weakened portion extend over the entire width of the transition, i.e., in the circumferential direction of the outer sleeve.

In accordance with a preferred embodiment of the invention, the weakened portion may be a recess in the form of a groove which, from a manufacturing-engineering standpoint, is readily produced. Such a design is advantageous, for example, when only a limited, that is to say, slight resilience is desired. The groove may be advantageously located on the outside of the outer sleeve.

In order to provide good elasticity at the transition and of the ball-carrying raceway section adjoining it, the recess in a further embodiment of the invention may be in the form of a slot. The width of the slot, i.e., axially of the bearing, is relatively small in relation to the diameter of the balls so that the balls may pass the slot without interference. The two portions of the transition separated by the slot advantageously pass into each other approximately tangentially, i.e., in a straight line with respect to one another, in the direction of the raceway, so that an unimpeded, smooth runway is provided for the balls.

In the preferred embodiment of the invention, each of the ball-carrying, axially parallel raceway sections is provided with a ball-guiding groove, the bottom of the groove engaging the loaded balls. Each transition of a loaded ball carrying raceway is provided, in the portion thereof which constitutes a unitary part of the groove and extends as far as the slot, with a depression which contacts the balls at pairs of points, located opposite each other on the two legs of a V-shaped line of contact, the tip of the line of contact being adjacent to the raceway groove. This modification of the ball bearing in accordance with the invention has the particular advantage that, due to the two-point contact of the balls with the transition, the balls being loaded rapidly assume the motion forced on them and, because of the V-shape of the line of contact, are directed toward the center of the load-carrying raceway section.

In one particular embodiment of the ball bearing in accordance with the invention, the radial rigidity of the stamped raceway sections can be increased by the provision of a strip, more specifically, a slotted sleeve, surrounding the outer sleeve. The outside diameter of the slotted sleeve should be the same as that of the outer sleeve, in order to provide better support for the outer sleeve in the mounted condition.

BRIEF FIGURE DESCRIPTION

In order that the invention will be more clearly understood, it will now be disclosed in greater detail with reference to the accompanying drawings, wherein:

FIG. 3 is half of a longitudinal cross-section of a ball bearing in accordance with a further embodiment of the invention;

FIG. 4 is an enlarged partial longitudinal cross-section through the outer sleeve of the bearing of FIG. 3;

FIG. 5 is a cross-section taken along the line V—V in FIG. 4;

FIG. 8 is a greatly enlarged cross-sectional view of a portion of the outer sleeve of the ball bearing of FIG. 3;

FIGS. 9A–9D are cross-sectional views illustrating the positioning of a ball bearing in the transition groove of FIGS. 8 and 10, in the planes A, B, C, and D, respectively; and FIG. 10 is an inside view of the transition of a ball bearing sleeve in accordance with FIG. 8.

DETAILED DISCLOSURE OF THE INVENTION

Figure 1:
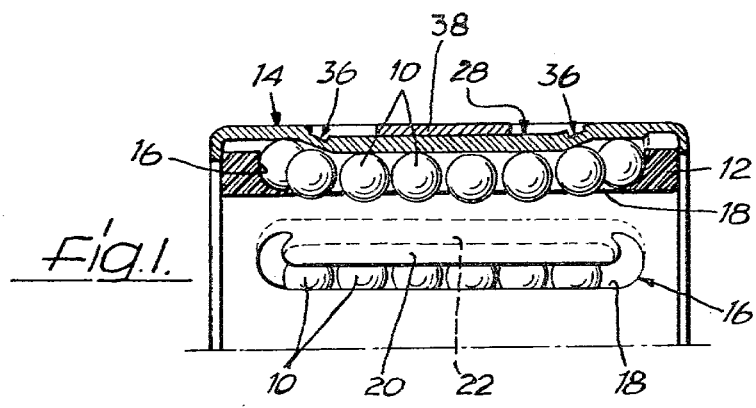
FIG. 1 is half of a longitudinal cross-section of a ball bearing in accordance with the invention.

The ball bearings illustrated in the drawings are adapted to be mounted on a shaft or rod (not shown) relative to which an axial relative movement is possible, and, as shown in FIGS. 1 and 3, essentially consist of a plurality of sets of balls 10 arranged in continuous oval rows, a cage 12 receiving said balls, and an outer sleeve 14 enclosing the cage and the balls.

In the embodiments of FIGS. 1 and 3, the cage 12 is a circular cylindrical hollow body, for example, of a plastic material and has a plurality of oval, ball-carrying guideways 16 distributed uniformly over its circumference. Each guideway 16 has an aperture 18 extending radially therethrough, the aperture extending axially and terminating in substantially C-shaped portions. The width of the aperture is smaller throughout then the diameter of the balls 10. This portion of the guideway guides the balls under load. The complementary, approximately straight portion of every guideway 16 is provided with a connecting member 22 holding a self-supporting track core 20 which holds the balls 10 radially spaced from the shaft. The balls in this portion of the guideways are not under load. However, the balls 10 located in the above-noted C-shaped portion of every guideway 16 can contact the shaft.

As further shown in FIGS. 1 and 3, the outer sleeve 14 is a hollow circular cylinder of drawn steel tubing or of rolled sheet steel, and formed with precision. The two flangelike ends 24 and 26 of the sleeve extend radially inward to enclose the ball cage 12 so that the latter is axially fixed in the outer sleeve 24. The inside diameter of the ends 24 and 26 is at least as large as the diameter of the shaft. The outer sleeve 14 is provided with inwardly directed axially extending ridges 28 which extend parallel to the guideways, the number and position of the ridges corresponding to the straight portions of the guideways 16 for balls under load in the cage 12. Every ridge 28 has approximately the shape of a hollow truncated pyramid having a trapezoidal longitudinal section, and having an axially extending parallel ball-guiding groove 30 in its center. This provides the cross-section of the ridge with a corrugated profile. The groove 30 forms the ball-carrying, axially extending raceway section of the associated raceway, which is determined by the guideway 16 adjacent thereto in the cage. The balls 10 hug the concave bottom 32 of the groove 30. At its two ends, spaced far apart, every ridge 28 has a ramplike transition 34 forming a gently ascending or descending transition of the raceway. For elucidation, the inclination of the transitions 34 is shown greatly exaggerated in FIGS. 1 and 2 as well as in FIGS. 3–5 and 8 of the drawing. The radial difference in height bridged by the transition is actually about 1 mm. The ridge 28 may be formed by pressing the outer shell from the outside thereof, whereby a corresponding recess will be formed in the outer circumference of the outer shell.

Figure 2:
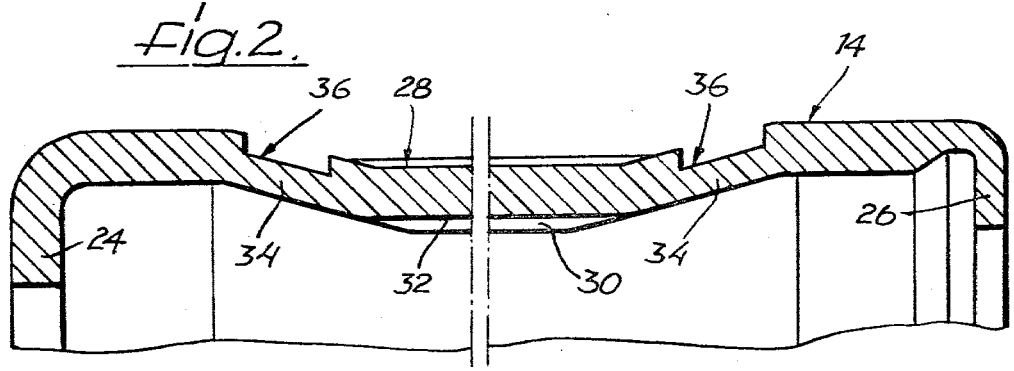
FIG. 2 is an enlarged partial longitudinal cross-section through the outer sleeve of the ball bearing of FIG. 1.
Figure 6:
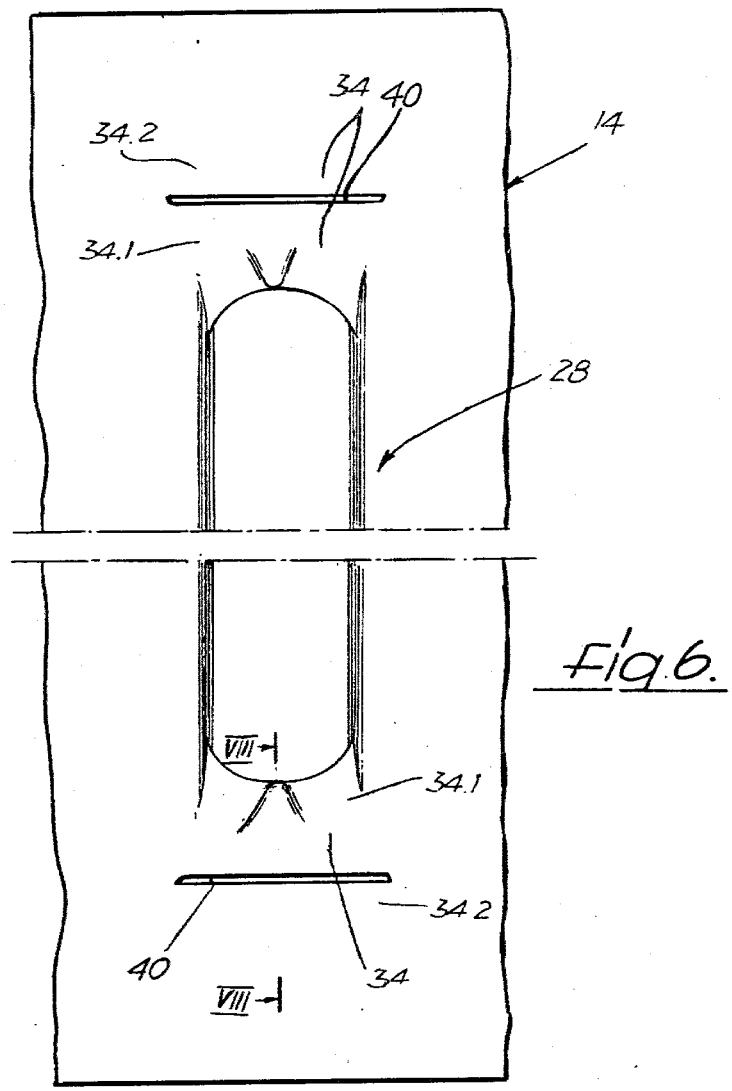
FIG. 6 is a discontinuous view in the direction of the arrow of FIG. 5, of a ball-carrying raceway section of the outer sleeve.
Figure 7:
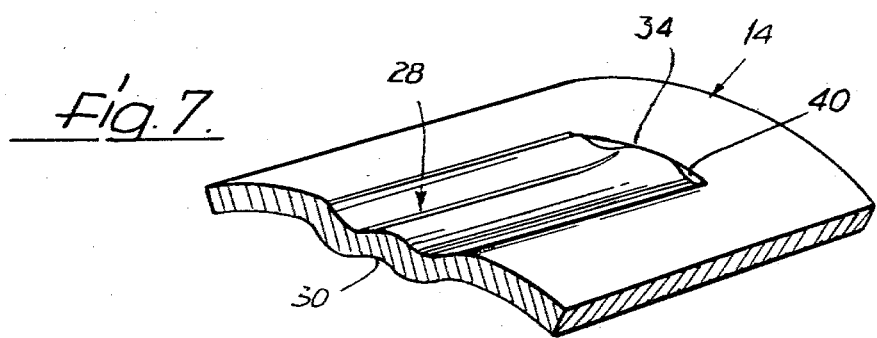
FIG. 7 is a perspective view of a portion of the outer sleeve of the ball bearing of FIG. 3, in the vicinity of a raceway section.

In the embodiment according to FIGS. 1 and 2, every transition 34 is, in accordance with the invention, externally weakened by a groove 36 so that a kind of weak-point link is obtained which makes the load-carrying raceway section 28 radially resilient parallel to the axis. Obviously the form of the grooves 36 may also differ from that shown in FIG. 2. For example, the grooves may be substantially wider and/or provided with a base surface extending parallel to the longitudinal direction. The grooves provided may also serve to axially fix the ball bearing in a housing, in which case a snap ring or the like may be inserted in these grooves. The grooves 36 may thus be annular, i.e., extend completely around the outer shell. For uniform loading of the load-carrying balls it is advisable that the load-carrying raceway section 28 itself possess relatively high radial rigidity. In order to improve the latter, there is additionally provided in FIG. 1 in the vicinity of the straight portion of the raceway sections a slotted sleeve 38 whose outside diameter is the same as that of the outer sleeve 14. In this case, of course, the entire central axial region of the outer sleeve has a reduced radial outer dimension, so that the radially outer dimension of the slotted sleeve 38 may conform to the outer radial dimensions at the axial ends of the outer sleeve 28, as shown in FIG. 1.

In the embodiment according to FIGS. 3 to 10, every transition 34 is provided, in accordance with the invention, approximately midway therealong in the axial direction, with a slot 40. The slot extends over the entire width of the transition (in the circumferential direction) the width of the slot (in the axial direction of the bearing) being small in relation to its length. The slot 40 bisects the transition 34 into a lower portion 34.1 and an upper portion 34.2, which are separated from each other by the slot. (FIG. 8.) Every lower portion 34.1 has a depression 42 with a concave bottom and convex rims. The rims contact the balls at pairs of points opposite each other on the two legs 44.1 and 44.2 of a V-shaped line of contact 44 (FIG. 10), the tip or apex 44.3 being at the radial height of the section of the raceway formed by the groove 30. The greatest width of the depression 42, (in the circumferential direction of the bearing) is approximately equal to the length of the slot, and occurs at the slot 40.

In operation, when a ball, coming from the upper portion 34.2, rolls up the transition 34 and past the slot 40, the depression 42 will capture the ball and conduct it toward the centerline of the groove 30. Both the upper portion 34.2 and the lower portion 34.1 of the transition 34, as well as the groove 30, are then able to yield elastically, that is to say, give way radially somewhat to the ball, to facilitate particularly the introduction of the ball into the narrowed space between the ridge 28 and the shaft. Due to the occurrence of the two-point contact of the ball 10 with the two rims of the depression 42, the rotary motion of the ball, which initially is not desired, is adapted to the kinematic requirements.

FIGS. 9A–9D illustrate the contact of the ball 10 with the V-shaped line of contact 44, in different transverse planes of the ball bearing, as identified by transverse planes A–D of FIGS. 8 and 10. From these figures it is apparent that the two-point contact gradually merges from the slot 40 to a single contact point at the groove 30, as shown in FIG. 9D.

While the invention has been described and disclosed with reference to a limited number of embodiments, it is apparent that variations and modifications may be made therein, and it is intended in the following claims to cover each such variation and modification as follows within the true spirit and scope of the invention.

What is claimed is:

1. In a ball bearing for linear motion including a cage with oval guideways and an outer sleeve receiving said cage, said sleeve having parallel axially extending raceway sections with a transition at each end for receiving balls under load, each transition extending radially outwardly from the respective raceway section; the improvement wherein each transition has a radially weakened portion extending transversely of the respective raceway section.

2. The ball bearing of claim 1, wherein the weakened portion is at the radially outer end of the transition.

3. The ball bearing of claim 1, wherein the weakened portion comprises a recess.

4. The ball bearing of claim 3, wherein said recess comprises a groove in said outer sleeve.

5. The ball bearing of claim 4, wherein said groove is an annular groove in the outer surface of said outer sleeve.

6. The ball bearing of claim 3, wherein said recess comprises a transversely extending slot separating said transition into two portions.

7. The ball bearing of claim 6, wherein said slot has a width in the axial direction of said bearing that is small in comparison with the diameter of balls in said ball bearing.

8. The ball bearing of claim 7, wherein the portions of said transition on opposite sides of said slot extend tangential to one another, in the direction of the raceway, to provide smooth passage of a ball thereacross.

9. The ball bearing of claim 6, wherein said raceway has an axially extending groove, and said transitions have V-shaped radially outwardly extending recesses with apices at the ends of said groove and terminating at said slot, whereby two-point lines of contact are provided for the balls in the portions of the transition between said slot and said groove.

10. The ball bearing of claim 9, wherein the apices of the groove have the same radial height as said groove.

11. The ball bearing of claim 6, wherein said slot is provided midway of said transition in the axial direction, and extends circumferentially completely across said transition.

12. The ball bearing of claim 1, wherein the weakened portion extends throughout the circumferential extent of the transition.

13. The ball bearing of claim 1, further comprising a slotted strap surrounding said outer sleeve and the portion of said bearing radially outward of the straight portions of said guideways.

14. The ball bearing of claim 1, wherein said raceways comprise radially inwardly directed axially extending ridges in said outer sleeve, and axially extending grooves at the peaks of said ridges for contacting said balls.

* * * * *

UNITED STATES PATENT AND TRADEMARK OFFICE
CERTIFICATE OF CORRECTION

PATENT NO. : 4,239,299
DATED : December 16, 1980
INVENTOR(S) : Albert Hoffman, Et al It is certified that error appears in the above—identified patent and that said Letters Patent is hereby corrected as shown below:

Column 1, line 10, change "or" to --of--.

Signed and Sealed this

Sixth Day of October 1981

[SEAL]

Attest:

GERALD J. MOSSINGHOFF

*Attesting Officer*     *Commissioner of Patents and Trademarks*